United States Patent [19]

Morishita et al.

[11] Patent Number: 4,604,907
[45] Date of Patent: Aug. 12, 1986

[54] REDUCTION GEAR DEVICE FOR A COAXIAL TYPE STARTER

[75] Inventors: Akira Morishita; Kyoichi Okamoto, both of Himeji, Japan

[73] Assignee: Mitsubishi Denki Kabushiki Kaisha, Tokyo, Japan

[21] Appl. No.: 669,080

[22] Filed: Nov. 7, 1984

[30] Foreign Application Priority Data

Nov. 7, 1983 [JP] Japan .................. 58-172139[U]

[51] Int. Cl.⁴ .................................... F02N 15/06
[52] U.S. Cl. .......................... 74/7 E; 74/7 A; 277/57; 310/58
[58] Field of Search ............ 74/6, 7 A, 7 C, 7 E, 74/606 A; 277/57; 310/58, 60 R

[56] References Cited

U.S. PATENT DOCUMENTS

| | | | |
|---|---|---|---|
| 1,708,044 | 4/1929 | Baumann | 277/57 X |
| 2,203,795 | 6/1940 | Nardone | 74/7 |
| 3,209,603 | 10/1965 | Rodriguez | 74/7 |
| 3,670,190 | 6/1972 | Goebel | 310/60 |
| 4,140,280 | 2/1979 | Allen et al. | 74/606 A X |
| 4,399,379 | 8/1983 | Marks et al. | 310/58 X |
| 4,495,825 | 1/1985 | Ruhle | 74/7 E |
| 4,507,978 | 4/1985 | Tanaka et al. | 74/7 E |
| 4,519,261 | 5/1985 | Hamano | 74/7 E |
| 4,520,285 | 5/1985 | Isozumi et al. | 74/7 E X |

FOREIGN PATENT DOCUMENTS 2117836 10/1983 United Kingdom.

*Primary Examiner*—Allan D. Herrmann
*Attorney, Agent, or Firm*—Oblon, Fisher, Spivak, McClelland & Maier

[57] ABSTRACT

A reduction gear device is used for a coaxial type starter and is disposed between a rotary shaft of a motor and a rotary shaft of a starter pinion, both shafts being arranged in the same axial line. In the reduction gear, a through hole is formed in a machine frame for a reduction gear to cause air flow and a labyrinth-sealing structure for prevention of dust is formed near the through hole.

7 Claims, 3 Drawing Figures

REDUCTION GEAR DEVICE FOR A COAXIAL TYPE STARTER

BACKGROUND OF THE INVENTION

The present invention relates to a starter device for an engine. More particularly, it relates to an improvement in a reduction gear device for an internal speed reduction type starter in which an input shaft and an output shaft are arranged in a single and the same axial line.

FIG. 1 shows a conventional reduction gear device of this kind.

In FIG. 1, a reference numeral 1 designates an internal speed reduction type starter containing therein an epicyclic reduction gear 2, in which a rotary shaft 5 of the armature 4 of the a d.c. motor 3 and a rotary output shaft 7 with which a starter pinion 6 is engaged through a spline structure so as to be slidable in the axial direction, are arranged in a single and the same axial line. The d.c. motor 3 comprises a stator 8, an armature iron core 9 secured to the rotary shaft 5 and an armature winding 10 wound on the armature iron core. A spur gear 11 is formed at the front part of the rotary shaft 5 and a planet gear 12 of the epicyclic reduction gear 2 is always interlocked with the spur gear 11. A sleeve bearing 13 is fitted to a through hole 12a formed in the planet gear 12 and the sleeve bearing 13 receives therein in a freely rotatable manner a pin 15 which is attached to a flange 14 having function of an arm of the epicyclic reduction gear 2. The flange 14 is fixed to the rear end part of the rotary shaft 7 at the output side. A ring gear 16 is formed integrally with a machine frame 17 which rotatably supports the rear end part of the rotary shaft 7 through a sleeve bearing 18 fitted to a central through hole 17a. A recess 19 is formed at the rear end part of the rotary shaft 7. The recess 19 receives the front bearing part 5a of the rotary shaft 5 for the armature 4 through a sleeve bearing 20 in a freely rotatable manner. A shift lever 21 is pivotally supported by a pivotal part 21a and the shift lever 21 is engaged with the starter pinion 6 to shift the same in the axial direction. There is provided a stopper 22 which is retained in an annular groove 7a formed in the rotary shaft 7 by means of a ring 23, the stopper 22 restricting forward movement of the starter pinion 6. A front frame 24 has a through hole 25 at its front end part. A sleeve bearing 26 is fitted to the through hole 25. A bearing part 7a which is formed by finely finishing the front end part of the rotary shaft 7 is rotatably supported by the sleeve bearing 26.

The operation of the conventional device will be described. When the shift lever 21 is rotated counterclockwisely around the pivotal part 21a, as shown in the arrow mark A, the starter pinion 6 is shifted on the rotary shaft 7 in the direction of the arrow mark(on the right hand), namely the starter pinion 6 is moved forwardly until it impinges the stopper 22. Then, the pinion 6 is interlocked with a ring gear (not shown) of an engine. At the same time, the d.c. motor 3 is actuated by current conduction and a rotational force is transmitted to the epicyclic reduction gear 2 through the spur gear 11 formed in the rotary motor shaft 5. By a series of operations as above mentioned, the planet gear 12 is caused to roll on the ring gear 16 to thereby rotate the flange 14 by means of the pin 15. The rotational force is transmitted to the pinion 6 on the rotary shaft 7; thus, the engine is started through the ring gear (not shown) by the rotational force.

When the shift lever 21 is returned to a position as shown in FIG. 1, the starter pinion 6 is retracted along the rotary shaft 7 to a position as shown in the FIG. 1. Then, current conduction to the d.c. motor 3 is stopped whereby the entire device is stopped.

In the conventional starter device for an engine having the construction as above mentioned, when the epicyclic reduction gear 2 is of an enclosed structure(although it is normal for the reduction gear to have the enclosed structure when it is installed in an engine starter device), structural elements constituting a reduction gear mechanism are heated at high temperature due to mechanical friction caused during the revolution of the starter device whereby there results excessive wearing of the rotating parts.

SUMMARY OF THE INVENTION

It is an object of the present invention to provide a reduction gear device for a coaxial type starter having an excellent heat-radiation property and dust-prevention effect by providing a heat-radiation hole and a labyrinth-sealing structure in a reduction gear mechanism to thereby eliminate the disadvantage of the conventional device.

The foregoing and the other objects of the present invention have been attained by providing a reduction gear device for a coaxial type starter disposed between a rotary shaft of a motor and a rotary shaft of a starter pinion, both shafts being arranged in the same axial line, in which a through hole is formed in a machine frame for supporting a reduction gear to cause air flow and a labyrinth-sealing part for prevention of dust is formed near the through hole.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 3:
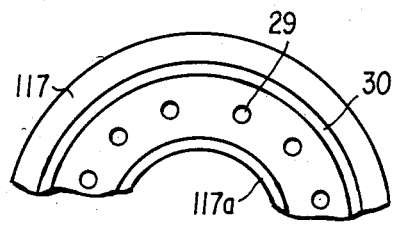
FIG. 3 is a partial view of the frame only, as seen along line III—III of FIG. 2.
Figure 1:
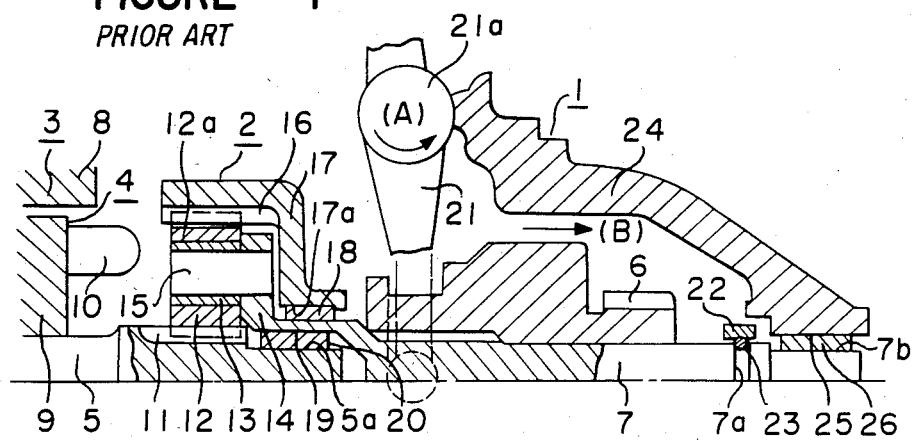
FIG. 1 is a cross-sectional view of an important part of a conventional reduction gear device.

An embodiment of the present invention will be described with reference to drawing in which the same reference numerals as in FIG. 1 designate the same parts.

Figure 2:
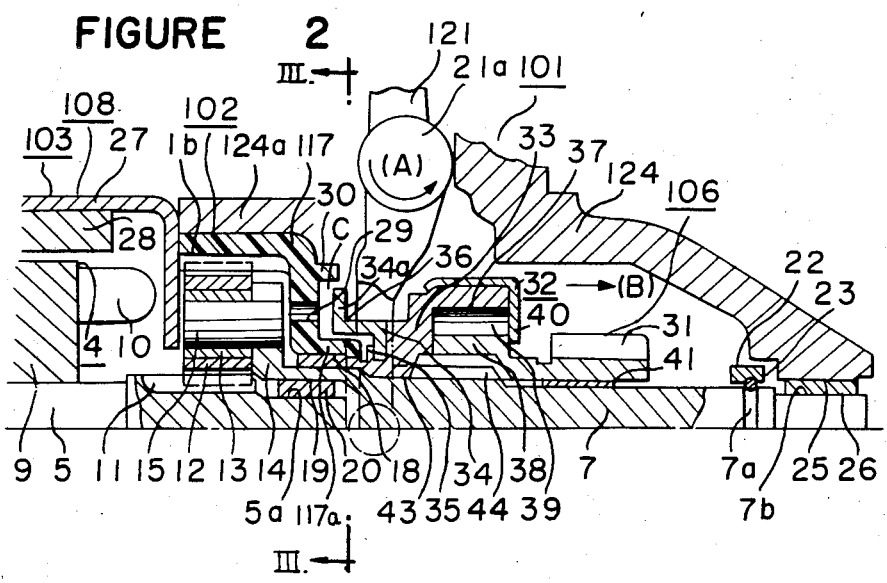
FIG. 2 is a cross-sectional view of an embodiment of an important part of the internal speed reduction type starter of the present invention.

In FIG. 2, a reference numeral 101 designates an internal speed reduction type starter having an epicyclic reduction gear 102. A d.c. motor 103 has a machine frame 27 for a stator 108 which is attached to both an opening 124a of a front machine frame 124 and an opening of epicyclic reduction gear 102. On the inner circumferential surface of the machine frame 27, magnetic poles made of ferrite permanent magnet are attached. A frame 117 formed by molding synthetic resin for mechanical structure in which the ring gear 16 is integrally formed is provided with a plurality of through holes 29 opening in the axial direction for radiating heat caused by mechanical friction in the epicyclic reduction gear outside and a flange or an annnular projection 30 for prevention of dust which projects from the outer circumferential surface to surround the through holes 29, in addition to the structure of the conventional machine frame 17 as shown in FIG. 1 and an annular flange 117a for bearing 18. A starter pinion 106 is constituted by two kinds of structural elements, namely a pinion 31 being slidable on the rotary shaft 7 in the axial direction and an overrunning clutch 32. A clutch outer member 33 is fitted to the rotary shaft and has at the rear end a collar ring 34 which is attached by means of a snap ring 35 to prevent it from coming off. An annular groove 36 having a channel shape in cross-section is formed by both the clutch outer member 33 and the collar ring 34. The lower end of a shift lever 121 is adapted to cam-engage with the cam surface of the annular groove 36. The collar ring 34 is provided with a flange 34a whose one side surface faces the through holes 29 and extends near the annular projection 30 whereby a labyrinth-sealing structure C is formed in cooperation of an end surface of the machine frame 117. Thus, dust is prevented from entrance into the epicylic reduction gear 102 through the through holes 29. A cam surface 37 is formed in the inner circumferential part at the front part of the clutch outer member 33 to form a wedge-like space in association with a clutch inner member 38 and friction rollers 39 are received in the wedge-like space so as to engage with the narrow portion. A cover plate 40 is provided to confine the elements constituting the overrunning clutch 32. A sleeve bearing 41 is fitted to the inner surface of a through hole 42 formed in the pinion 31 so as to be loosely fitted to and slidable along the rotary shaft 7. A helical spline 43 is formed in the inner circumferential surface at the rear part of the clutch outer member 33, and a helical spline 44 is formed in the rotary shaft 7 in its axial direction through spline engagement.

The operation of the reduction gear according to the present invention will be described.

When the shift lever 121 is turned counterclockwisely in the direction of the arrow mark A around the pivotal part 21a, the starter pinion 106 is moved forwardly in the direction of the arrow mark B on the rotary shaft 7 whereby the pinion 31 is interlocked with a ring gear (not shown) of the engine. At the same time, the d.c. motor 103 is actuated by current conduction and the revolution of the motor is subjected to reduction in speed by the epicyclic reduction gear 102 to be transmitted to the rotary shaft 7. The rotational force of the rotary shaft 7 is transmitted to the clutch outer member 33 connected to the rotary shaft 7 through the spline engagement and then, transmitted to the clutch inner member 38 through the friction rollers 39 whereby the engine is started by means of the pinion 31.

After starting the engine, the pinion is conversly energized at a high revolution speed by the ring gear(-not shown). However, when the revolution speed of the clutch inner member 37 exceeds the revolution speed of the clutch outer member 33, the fricitonal engagement between the clutch outer member and the friction rollers 39 is disconnected to cause rotation of only the clutch inner member 37 and the pinion 31 along with the ring gear(not shown) whereby the clutch outer member and other rotating elements to be driven before the clutch outer member are freely rotated by the d.c. motor 103 without any load.

Then, when the shift lever 121 is returned to a position as shown in the FIG. 2, the starter pinion 106 is returned to a position as shown in the figure and gear engagement between the pinion 31 and the ring gear is released, on account of which the device is stopped after inertial revolution of several seconds. With the construction of the reduction gear, heat produced by mechanical friction in the epicyclic reduction gear is effectively radiated through the through holes 29 formed in the machine frame 17 to prevent temperature rise in the rotating elements. Particularly, the labyrinth-sealing structure is not formed between the flange 34a of the collar ring 34 and the annular projection 30 of the machine frame 117 when the starter pinion 106 is moved forwardly whereby the heat radiating effect is remarkably improved. Further, when the starter pinion 106 is at rest, the reduction gear is protected from entrance of dust by the labyrinth-seal structure as above mentioned.

In the foregoing, description has been made as to use of the epicyclic reduction gear as a speed reduction device. However, the same effect can be obtained by using a speed reduction device in which an input shaft and an output shaft are arranged in a single and the same axial line.

As described above, in accordance with the present invention, a machine frame of a reduction gear in which an input shaft and an output shaft of a starter are arranged in the same axial line, is provided with a through hole and a labyrinth-sealing structure formed in association with a collar ring of an overrunning clutch. Accordingly, there is obtainable with a reduction gear having a simple structure and excellent heat radiation characteristic as well as dustproof effect.

We claim:

1. In a coaxial type starter having a starter motor including a motor shaft and a starter pinion mounted on an output shaft coaxial with said motor shaft, a reduction gear device comprising:
   reduction gear means associated with said motor shaft and said output shaft for tarnsferring rotation of said motor shaft to said output shaft with a speed reduction ratio;
   annular stationary frame means at least partially enclosing said reduction gear means;
   at least one through hole formed in a portion of said machine frame to permit air flow through said machine frame; and
   labyrinth sealing means for preventing the entry of dust into said machine frame via said through hole, said sealing means comprising projections formed on said machine frame on two sides of said through hole, and a ring element positionable between said projections and adjacent said through hole.

2. The starter of claim 1 wherein said at least one through hole comprises an annular plurality of axially extending through holes on a radially extending annular surface of said machine frame, wherein said projections comprise annular projections on radially opposite sides of said annular plurality of through holes, and wherein said ring element is annular.

3. The starter of claim 2 wherein said ring element comprises a portion of a collar ring of said starter pinion.

4. The starter of claim 3 wherein said portion of said collar ring comprises a radially extending annular flange.

5. The starter of claim 3 wherein said starter pinion includes an outer member having an annular groove for cooperation with a shift lever.

6. The starter of claim 1 wherein said machine frame is formed of synthetic resin.

7. The starter of claim 6 wherein said reduction gear means comprises an epicyclic gear train including a ring gear formed integrally with said machine frame.

* * * * *